(12) United States Patent
Giebel et al.

(10) Patent No.: US 8,020,332 B2
(45) Date of Patent: *Sep. 20, 2011

(54) DEVICE AND SAFEGUARD UNIT FOR THE STORAGE OF A FIREARM

(75) Inventors: Karl Friedrich Giebel, Hohenbrunn (DE); Daniel Graser, Unterschleißheim (DE); Ernst Mauch, Dunnigen (DE); Stefan Parhofer, München (DE); Vaso Pavlicic, München (DE); Dirk Steuwer, München (DE)

(73) Assignee: Armatix GmbH, Unterfohring (DE)

( * ) Notice: Subject to any disclaimer, the term of this patent is extended or adjusted under 35 U.S.C. 154(b) by 6 days.

This patent is subject to a terminal disclaimer.

(21) Appl. No.: 12/771,083

(22) Filed: Apr. 30, 2010

(65) Prior Publication Data

US 2010/0263253 A1    Oct. 21, 2010

Related U.S. Application Data

(63) Continuation of application No. 11/682,975, filed on Mar. 7, 2007, now Pat. No. 7,735,253.

(30) Foreign Application Priority Data

Mar. 10, 2006  (DE) ............................ 10 206 011 266

(51) Int. Cl.
*F41A 17/00* (2006.01)
(52) U.S. Cl. ..................................... 42/70.11
(58) Field of Classification Search ................... 42/70.11
See application file for complete search history.

(56) References Cited

U.S. PATENT DOCUMENTS

| 945,520 | A | | 1/1910 | Greenwood |
|---|---|---|---|---|
| 1,579,552 | A | | 4/1926 | Ludlow |
| 2,327,334 | A | | 9/1941 | Parker |
| 2,939,587 | A | | 4/1959 | Kondziolka |
| 3,307,755 | A | | 3/1967 | Lentz |
| 4,570,890 | A | | 2/1986 | Lohn |
| 5,188,328 | A | | 2/1993 | Thompson |
| 5,271,174 | A | | 12/1993 | Bentley |
| 5,503,276 | A | * | 4/1996 | Pierce ............................ 211/64 |
| 5,913,557 | A | | 6/1999 | Jarock |
| 5,987,941 | A | | 11/1999 | Zocco |

(Continued)

FOREIGN PATENT DOCUMENTS

DE         102 31 685         2/2004

(Continued)

*Primary Examiner* — Bret Hayes
*Assistant Examiner* — Reginald Tillman, Jr.
(74) *Attorney, Agent, or Firm* — Miller, Matthias & Hull LLP

(57) ABSTRACT

Device for the storage of a gun with a base, a safety unit for the secure storage of the gun on the base and a controller, wherein the safety unit can be inserted at least partially into the barrel and/or a cartridge chamber of the gun and comprises a first safety section, which can be brought into a safety state, in which the safety unit is secured in the gun, and into a release state, in which the safety unit can be separated from the gun, and the controller brings the first safety section into its release state when a user authorization is received.

20 Claims, 18 Drawing Sheets

U.S. PATENT DOCUMENTS

| | | |
|---|---|---|
| 6,510,642 B2 | 1/2003 | Riener |
| 6,843,081 B1 | 1/2005 | Painter |
| 6,912,807 B2 * | 7/2005 | Meyerle et al. ............... 42/70.11 |
| 7,735,253 B2 * | 6/2010 | Giebel et al. ................. 42/70.11 |
| 2002/0032976 A1 | 3/2002 | Riener |
| 2007/0079540 A1 * | 4/2007 | Giebel et al. ................. 42/70.11 |
| 2008/0208847 A1 | 8/2008 | Moerchen et al. |

FOREIGN PATENT DOCUMENTS

| | | |
|---|---|---|
| DE | 102 40 119 | 3/2004 |
| EP | 0 959 318 | 11/1999 |
| GB | 2 082 293 | 3/1982 |

* cited by examiner

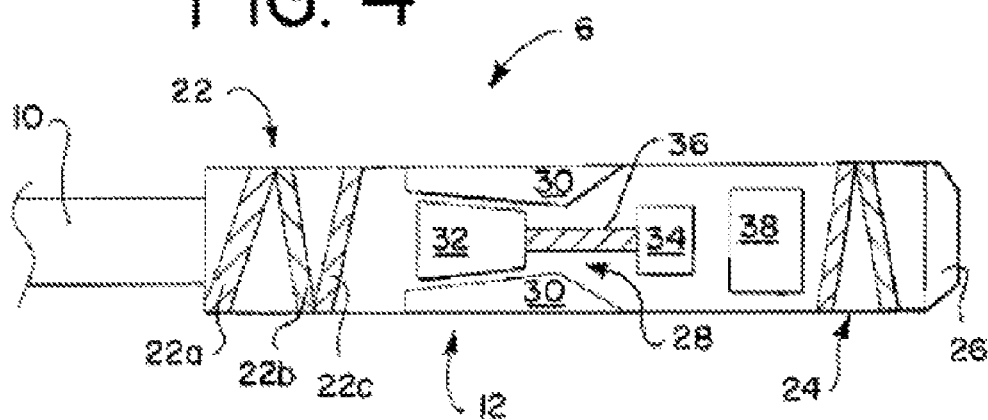
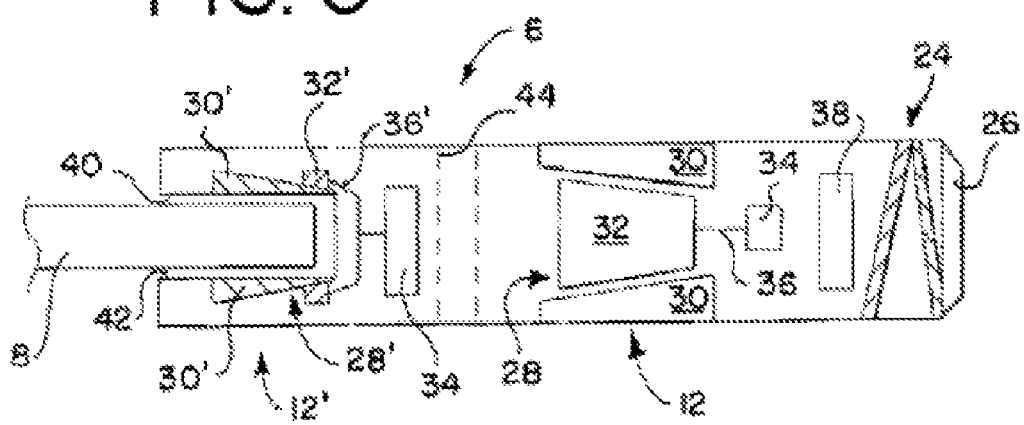
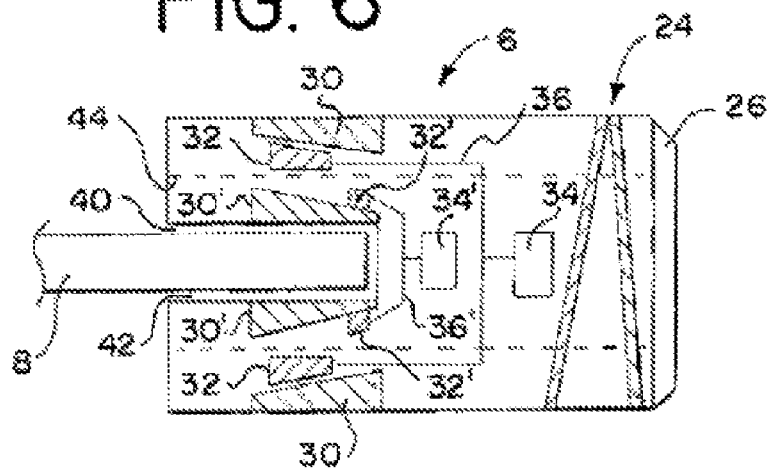

DEVICE AND SAFEGUARD UNIT FOR THE STORAGE OF A FIREARM

CROSS-REFERENCE TO RELATED APPLICATION

The present application is a continuation of U.S. patent application Ser. No. 11/682,975, filed on Mar. 7, 2007, the disclosure of which is herein incorporated by reference in its entirety.

FIELD OF THE DISCLOSURE

The present disclosure relates in general to a device for the storage of a gun and in particular a device for safely storing guns from unauthorized withdrawal and only enabling their withdrawal and, if applicable, their operation by authorized persons.

BACKGROUND OF THE DISCLOSURE

In order to securely store guns and to only allow authorized persons to access them, weapon cabinets, weapons safes, weapons cases and other devices are used, in which guns can be locked. Authorized persons can thus access stored guns if they have the correct key, number combinations, codes and/or other means specifying an access authorization and/or if corresponding biometric data from these people was registered and successfully checked. This type of locked storage is not suitable if guns need to be stored visibly and at the same time protected from unauthorized access. Another disadvantage is that such storage devices are difficult to open, whereby free access to otherwise normally unsecured, i.e., operative guns is possible.

In order to store guns in a manner such that they are visible but still protected from unauthorized removal, devices are normally used that secure the guns, e.g., using brackets, clamps, chains and such. One partial disadvantage hereby is that guns are only partially visible, because, e.g., a bracket serving as a fastener completely covers one side of the gun. Another disadvantage hereby is that secured fasteners are difficult to open by unauthorized persons, usually very simple, whereby in general not only an unauthorized removal but also unauthorized operation is possible.

Such disadvantages also exist in the case of devices, which are used during the carrying of guns by their users, such as, e.g., holsters for handguns. In the case of such devices, it is known to mechanically secure guns in a space provided for gun storage (e.g., hollow area/pocket of a holster), in that latches, locks, hooks and such engage with the barrel, the handle and/or in the area of the trigger of a gun and prevent the removal of the gun. The working connection(s) with the gun safety can be ended through the use of appropriate means (e.g., access codes, keys, individual-related/biometric data) and the gun can be removed.

Another disadvantage of the known approaches for storing guns is that information, e.g., on who removed which gun and when and/or whether this was unsuccessful due to lack of authorization, is not captured/provided.

Please see the following documents regarding the state of the art: DE 102 40 119, DE 102 31 685, U.S. Pat. No. 6,912,807, U.S. Pat. No. 5,188,328, U.S. Pat. No. 5,913,557, U.S. Pat. No. 5,503,276, U.S. Pat. No. 4,570,890, U.S. Pat. No. 1,579,552, U.S. Pat. No. 945,520 and GB 2082293.

SUMMARY OF THE DISCLOSURE

In order to solve the above object, the present disclosure provides a device for the storage of a gun, wherein the device comprises a base, a safety unit for the secure storage of the gun on the base and a controller, wherein the safety unit can be inserted into a barrel and/or a cartridge chamber of the gun and comprises a first safety section, which can be brought into a security state, in which the safety unit is secured in the gun and into a release state, in which the safety unit can be separated from the gun, and the controller upon authorization of a user to separate the gun and the safety unit brings the first safety section into its release state.

The device according to the disclosure serves to store one or more guns. The device according to the disclosure has a base, a safety unit for each gun for the secure storage of a gun on the base and a controller.

It is assumed below that the device according to the disclosure has one single safety unit, i.e., it is designed for the storage of one single gun. Embodiments with respect to the safety unit are also applicable for any other safety unit.

The safety unit can be inserted at least partially, preferably completely, into a barrel and/or a cartridge chamber of the gun and comprises a first safety section. The first safety section has a safety state and a release state and can be placed in one of these states. In the safety state, the first safety section in the gun is secured so that the safety unit cannot be separated from the gun without authorization and so that the gun cannot be removed without authorization. In the release state, the removal of the gun is enabled, wherein the safety unit can be separated and removed from the gun for this purpose.

For example, if there is a known user authorization for the removal of the gun from the controller and/or of another device, the controller brings the first safety section into its release state. For this purpose, the controller can be designed such that the safety unit or the first safety section can be controlled directly such that the release state can be taken up.

Alternatively, the controller can indirectly operate the first safety section in that the controller correspondingly controls a control unit arranged between the controller and the safety unit or the first safety section. Furthermore, one or more control elements, which are, e.g., implemented electromechanically or mechanically, can be controlled.

The controller can be implemented structurally as one individual, integrated component, which serves to control the entire device, according to the disclosure. The controller can also comprise two or more control units, which, e.g., can be attached to the base and the safety unit or one or more safety units.

In order to determine whether a user has an authorization to remove the gun, a preferably electronic authentication is provided. The authentication can be performed through the controller or through an authorization verification unit attached to the controller. The authorization verification unit can, e.g., comprise a memory, in particular, a nonvolatile memory (e.g., ROM), in which data and/or information is saved, which specifies one or more authorization for the removal of the gun. Such data and/or information include code, passwords and/or biometric data.

For the authentication of a user, who wants to remove the gun, the user provides his data and/or information (e.g., at least a code, password and/or biometric data) to the controller or the authorization verification unit. Should a comparison of the entered data and/or information and the saved data and/or information indicate that the user is indeed authorized to remove the gun, the first safety section is brought into the release state.

An authorization can indicate that a user may remove the gun from the safety unit and/or the base. An authorization can also indicate that a user may operate the gun. "Operation" of the gun is to be understood to mean, in particular, that the gun can be loaded with suitable munitions and/or fired. The user is also able to separate the gun and the safety unit from one another.

In one embodiment, the safety unit is permanently connected to the base. This can, e.g., be achieved via a rigid, e.g., rod-like, connection.

In another preferred embodiment, the safety unit can be attached to the base in a detachable manner.

Preferably, the first safety section and in particular the entire safety unit can be completely inserted into the barrel and/or the cartridge chamber of the gun.

Preferably, the first safety section can be locked, preferably braced, in the barrel and/or cartridge chamber of the gun in order to assume its safety state and unlocked, preferably released, in the barrel and/or cartridge chamber of the gun in order to assume its release state.

Furthermore, the safety unit can comprise a second safety section, which can be brought into a safety state, in which the second safety section is secured on the base; and can be brought into a release state, in which the safety unit can be released from the base.

In one embodiment, the base can have a support permanently connected with the base, on which the second safety section can be secured in its safety state and released from it in its release state.

The support can thereby be inserted into the second safety section, wherein it is provided that the second safety section can be locked on the support, preferably force-locked, in order to assume its safety state and unlocked from the support, preferably through the termination of the frictional connection, in order to assume its release state.

Furthermore, it is possible that the second safety section can be inserted into the support, wherein it is then provided that the second safety section can be locked in the support, preferably braced, in order to assume its safety state, and can be unlocked in the support, preferably released, in order to assume its release state.

The second safety section can (also) be completely inserted into the barrel and/or the cartridge chamber of the gun.

The second safety section can at least partially encase the first safety section and/or be series-connected with it.

It is provided that the controller is designed such that in the case of an authorization from a user to bring the first safety section into its release state, whereby the second safety section remains in its safety state, or to bring the second safety section into its release state, whereby the first safety section remains in its safety state.

In the case of two safety sections, the controller can be designed to bring the first safety section into its release state only if a user is authorized to remove and/or operate the gun.

Different authorizations are preferably used to remove the gun and to operate the gun, the validity of which can also depend on the sequence and/or the temporal interval in which they are provided. Thus, it is, e.g., possible that an authorization for the operation of the gun is only valid if there is or was a valid authorization for the removal of the gun beforehand and the temporal interval, in which the authorizations were provided/made available, and predetermined limit values are not exceeded and/or fallen short of. Furthermore, authorizations can only be limited for predetermined time intervals or sections (e.g., for certain days, times of day, or weeks) and/or temporally (e.g., from and/or until a predetermined date and/or time of day).

The controller, which is preferably implemented at least partially electronically, can be attached to the base, in that the controller is, e.g., attached to the base or is integrated in it.

Alternatively, the controller can be arranged in a section of the safety unit such that the controller can also be inserted completely into the barrel and/or the cartridge chamber of the gun. This can, e.g., be achieved in that the controller is arranged in a section of the safety unit, which is located adjacent to the first safety section.

As mentioned above, a verification of an authorization of a user can be performed by the controller or an authorization verification unit that is or can be connected to it.

An input unit is preferably provided in order to enter data and/or information, which specifies an authorization of a user for removing and/or operating the gun. The input unit can include at least one of the following components:

- a button, switch, slider or such, which can be activated by a person with removal authorization and/or that is accessible for this, wherein activation can specify that the safety section should be brought into its release state;
- an interface for entering a code, password or such (e.g., alphanumeric keyboard, number keypad, and/or microphone for speaking commands);
- one or more sensors for recording biometric data (e.g., sensor for recording a fingerprint, sensor for a retinal scan, sensor or sensor arrangements for recording characteristics of the face of a user, and/or sensor/microphone for recording linguistic characteristics);
- an interface and/or read device to read chip cards, smart cards and such;
- a device for the wireless reception of data and/or information specified for removal authorization (e.g., a receiver for transponder signals, RFID receivers for signals with, e.g., 125 kHz or 13.56 MHz, receivers for signals with, e.g., 25 kHz or 868 MHz, Bluetooth receivers, etc.).

The input unit can include the controller, in particular if the controller is integrated into the base or can be inserted into the barrel and/or the cartridge chamber of the gun, or it can be separate from the controller. Connection(s) between the input unit or its components and the controller can include corresponding data interfaces.

The controller can be designed to include data and/or information that specify the operation or operating states of the device according to the disclosure. Such data and/or information includes information on whether, when and how often the first and/or the second safety section is brought into the safety state and/or the release state, how long these states are maintained, whether, when and how often unauthorized removal attempts were made, which authorized users have used the device according the disclosure and how often, etc. Such information can, e.g., be saved and/or provided in so-called log files. This type of storage can be performed by the controller and, if applicable, using suitable memory components. Such logged data and/or information can be made available to users and/or data/information-processing devices, e.g., for analysis.

Furthermore, there can be an output unit for outputting data and/or information to a user. The output unit can be used, e.g., to make available to the user information on the operating state of the device according to the disclosure, e.g., whether or not the gun is secured on the base and/or whether to provide data and/or information (e.g., log files) recorded and logged by the controller. The output unit can also be used to request data and/or information from the user, which specifies the authorization to remove a gun when entered correctly. The data and/or information output can take place acoustically, optically and/or electrically or electronically. The output unit can be implemented separately from the controller or can include it.

The at least one safety section, i.e., the first safety section and/or, if provided, the second safety section are preferably designed such that securing forces can be created in the gun in the safety state, which affect adjacent contact surfaces, which can be interior surfaces of the barrel and/or the cartridge chamber and/or exterior or interior surfaces of a support on the base depending on the embodiment. Furthermore, the at least one safety section can be designed such that such forces can be increased if an unauthorized user tries to remove the safety unit from the gun.

It is provided in particular that forces can be increased in this manner such that the gun, in particular the interior surfaces of the barrel and/or the cartridge chamber, is damaged, rendering the gun unusable.

It is also possible that the controller has a control unit, which is preferably designed at least partially electronically.

It is also possible to arrange the control unit in a section of the safety unit, which can be inserted completely into the barrel and/or the cartridge chamber of the gun.

Furthermore, the disclosure provides a safety unit, which can be used to securely store a gun on a support fastened to a base. The safety unit comprises a first safety section, which can be inserted into a barrel and/or a cartridge chamber of the gun and which can be brought into a release state for release of the gun, and a second safety section, which can be brought into a safety state for securing on the base and into a release state for release from the base.

The first safety section can be completely inserted into the barrel and/or the cartridge chamber of the gun.

The first safety section can be locked, preferably braced, in the barrel and/or cartridge chamber of the gun in order to assume its safety state and unlocked, preferably released, in the barrel and/or cartridge chamber of the gun in order to assume its release state.

The first safety section and the second safety section can be series-connected.

The first safety section can at least partially encase the second safety section.

The second safety section can be inserted at least partially into the barrel and/or the cartridge chamber of the gun.

The second safety section can have a recess, into which a support connected with the base can be inserted, and can be locked on the support, preferably force-locked, in order to assume its safety state and can be unlocked from the support, preferably through the termination of the frictional connection, in order to assume its release state.

The second safety section can be inserted into a support connected with the base and can be locked in the support, preferably braced, in order to assume its safety state and can be unlocked in the support, preferably released, in order to assume its release state.

The safety unit can furthermore have a control unit, which is designed such that in the case of an authorization from a user to bring the first safety section into its release state, whereby the second safety section remains in its safety state, or to bring the second safety section into its release state, whereby the first safety section remains in its safety state.

The control unit can be designed to bring the first safety section into its release state only if a user is authorized to operate the gun.

The control unit can be arranged in a section of the safety unit, which can be inserted completely into the barrel and/or the cartridge chamber of the gun.

The control unit can be designed to perform a verification of an authorization of a user.

The safety unit can also have a unit, which is designed to perform a verification of an authorization of a user.

The unit for the verification of an authorization of a user can be arranged in a section of the safety unit, which can be inserted completely into the barrel and/or the cartridge chamber of the gun.

The safety unit can also have an input unit, with which data and/or information can be entered, which specifies an authorization of a user.

The input unit can be arranged in a section of the safety unit, which can be inserted completely into the barrel and/or the cartridge chamber of the gun.

The safety unit can comprise an actor, which is connected with the first safety section, in order to bring this alternatively into its safety state and its release state, and/or an actor, which is connected with the second safety section, in order to bring this alternatively into its safety state and its release state.

The at least one actor can be controlled by the control unit.

The at least one safety section can be designed to create securing forces on the adjacent contact surfaces in its safety state and to increase such forces in the case of force effect for unauthorized removal of the safety unit from the gun without user authorization.

The safety unit can be completely inserted into the barrel and/or the cartridge chamber of the gun.

BRIEF DESCRIPTION OF THE DRAWINGS

The following description refers to the attached drawings, wherein:

FIG. 4 shows an embodiment of a safety unit for the embodiment in FIG. 2;

FIGS. 5 and 6 show embodiments of safety units for the embodiment in FIG. 3;

For the sake of completeness, reference numbers are repeated in drawings if they have already been used once.

DESCRIPTION OF THE DISCLOSURE

Figure 1:
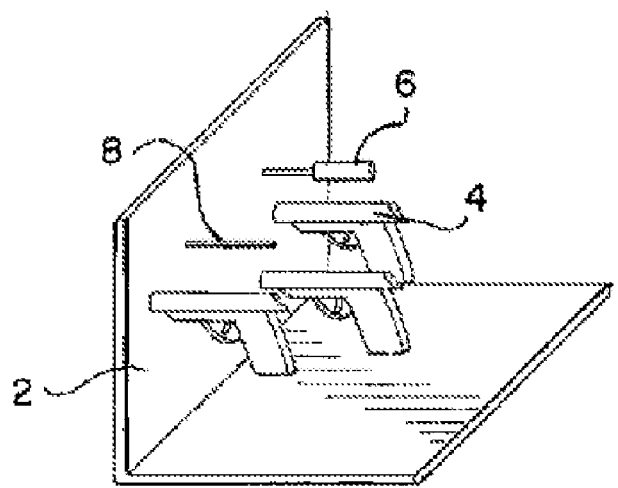
FIG. 1 shows a schematic view of a device according to the disclosure for the storage of several guns.

FIG. 1 shows a schematic view of an embodiment of the disclosure for the storage of several guns. The device has a base 2 on which the guns 4 are arranged. The guns 4 are secured on the base 2 using safety units 6. The safety units 6 can be permanently connected with the base 2. FIG. 1 shows, among other things, a safety unit 6, on which no gun is arranged. Furthermore, FIG. 1 shows a support 8, which is fastened on the base 2 and is provided for use with a safety unit (not shown) designed separately from the base 2. The base 2 can have only permanently connected safety units, only permanently connected supports or both permanently connected safety units as well as permanently connected support.

The base 2 can, e.g., be used to visibly show guns in stores, at trade fairs, at presentations and such.

In other embodiments that are not shown, the base can be integrated into a weapon cabinet, weapon safe or such, or represent an integrated structural component of such a storage device. In the latter case, it is possible to view the storage device as the base.

Furthermore, embodiments are provided in which a base is arranged in the access area of a person authorized to use a gun, such as on the bottom side of a table, in the glove box of a car, in a device for carrying a gun (e.g., holster) and such.

The embodiments described below assume the storage of one single gun. These types of embodiments apply to the storage of more than one gun and components and functions used for this purpose. We also refer to a gun in the form of a handgun. These types of embodiments also apply for guns in the form of other weapon types, in particular, long weapons.

Figure 2:
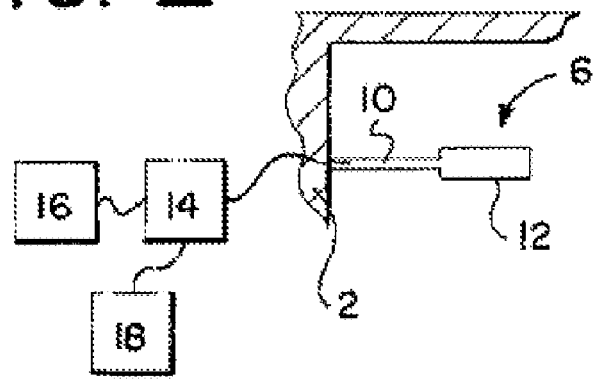
FIG. 2 shows an embodiment of the present disclosure with a safety unit permanently connected to the base.

FIG. 2 shows an embodiment, with a base 2, on which a safety unit 6 is permanently attached. The safety unit 6 is fastened on the base 2 by means of a connection 10 and has a first safety section 12. The thickness of the safety section 12 is to be measured such that it can be inserted into the barrel or a cartridge chamber of a gun. Furthermore, the length of the first safety section 12 is to be measured such that it can be inserted completely into the barrel or the cartridge chamber.

Advantageously, the first safety section 12 can be inserted as far as possible into the barrel or the cartridge barrel. In order to enable this for barrels or cartridge chambers with different lengths or depths, it can be advantageous to measure the connection 10 such that, e.g., in the case of short barrels, the connection 10 is partially visible or reachable, while in the case of long barrels, the connection 10 can also be inserted completely into the barrel.

In order to control the safety unit 6 and, in particular, the first safety section 12, a controller 14, e.g., in the form of a computer or application-specific, computer-based device, can be connected with the safety unit 6. The wired data connection shown in FIG. 2 can be realized at least partially through a wireless connection passage in the case of embodiments not shown here. Furthermore, an input unit 16 is provided, via which data and/or information can be entered, which specifies whether the inputting person is authorized for the removal of a gun arranged on base 2. Data and/or information on the operating state of the safety unit 6, in particular, on whether a gun arranged on the base 2 is secured on it or can be removed, can be provided to users via an output unit 18. Alternatively to the representation in FIG. 2, the controller 14, the input unit 16 and the output unit 18 can be integrated at least partially into one unit. Connections between the controller 14, the input unit 16 and the output unit 18 can be designed in a wired and/or wireless manner.

Figure 3:
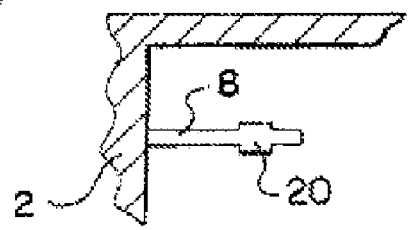
FIG. 3 shows an embodiment of the present disclosure with a safety unit that can be detached from the base.
Figure 7:
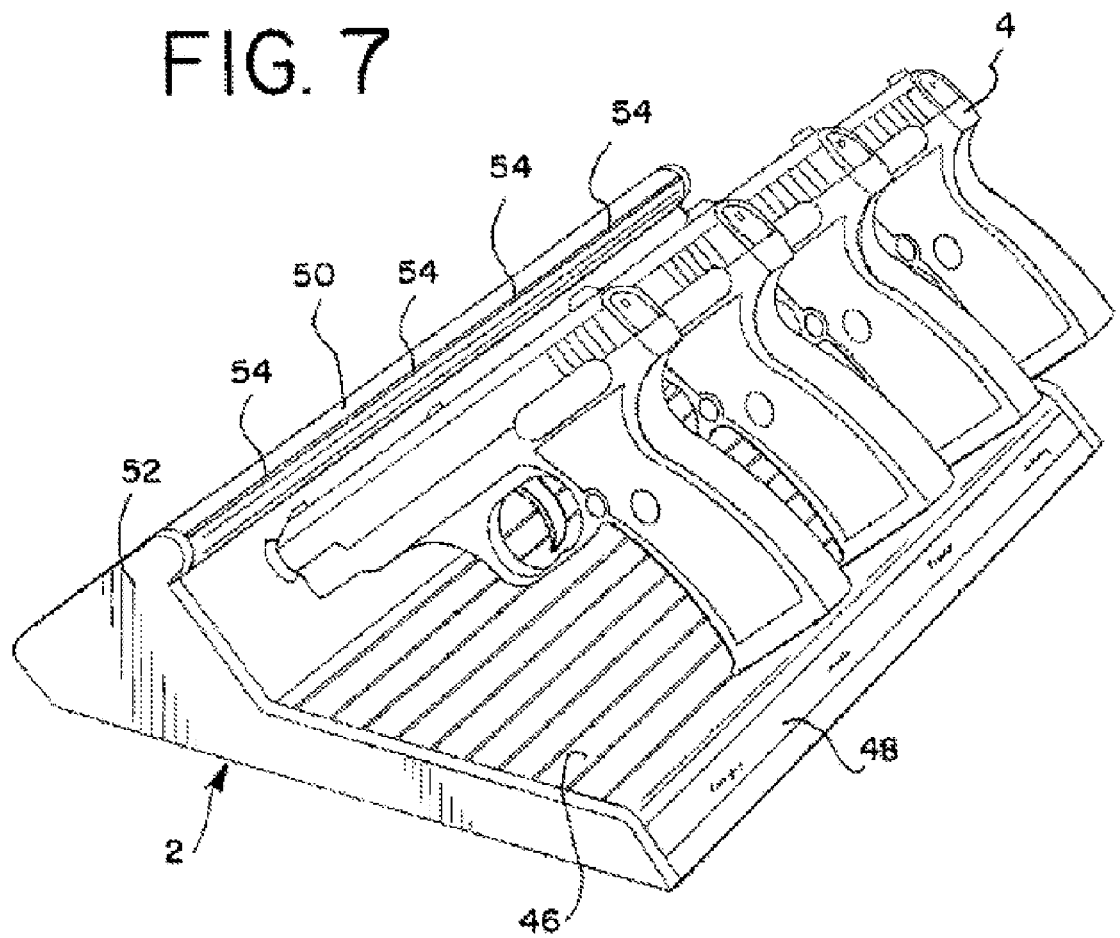
FIGS. 7 to 12 show perspective views of an embodiment of the present disclosure for securing and storing weapons, which, e.g., can be arranged on a table or in a display case.
Figure 8:
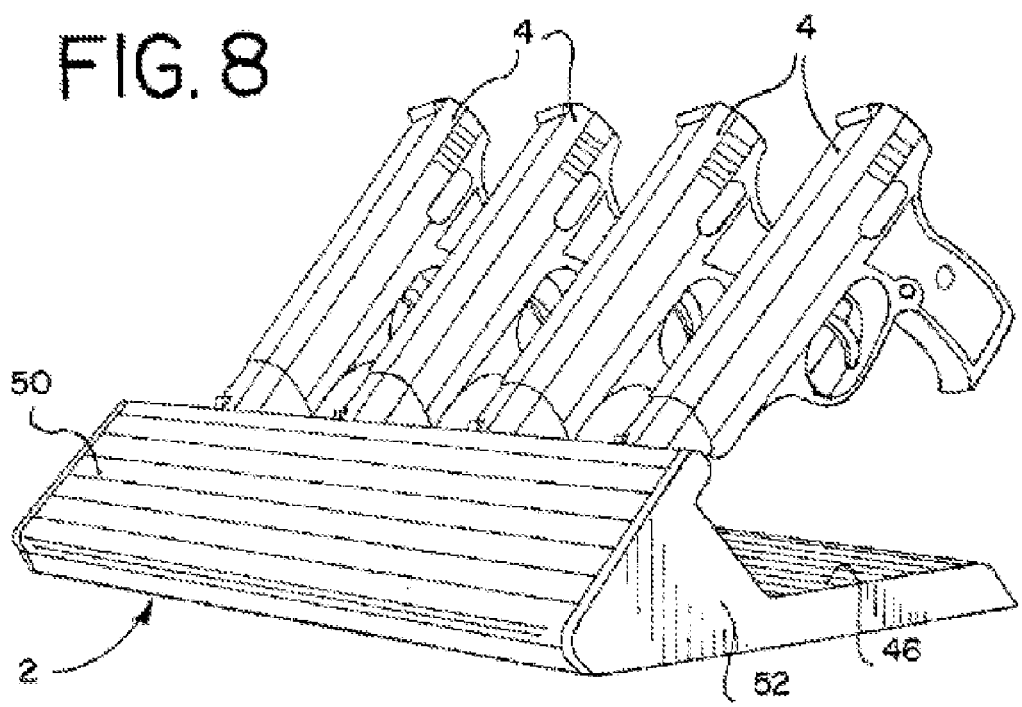
Figure 9:
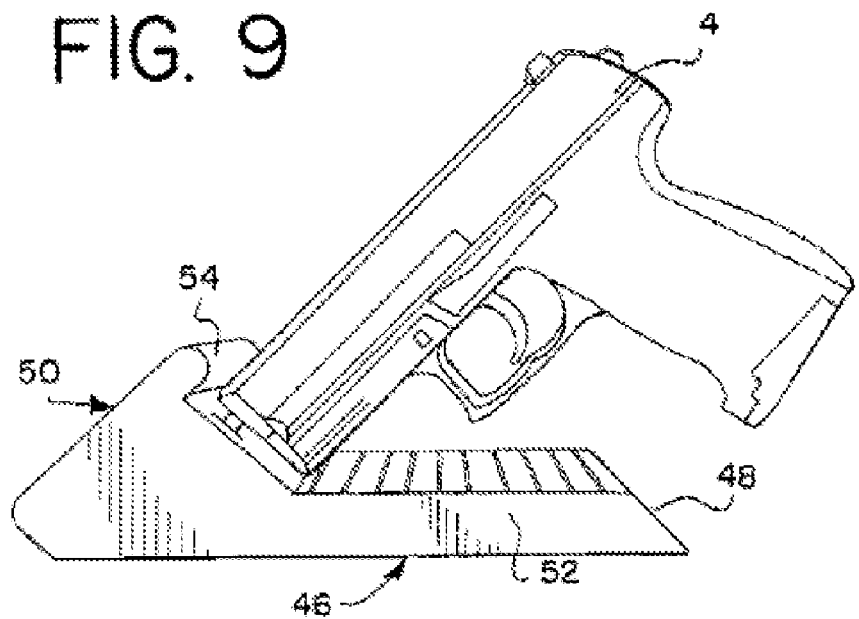
Figure 10:
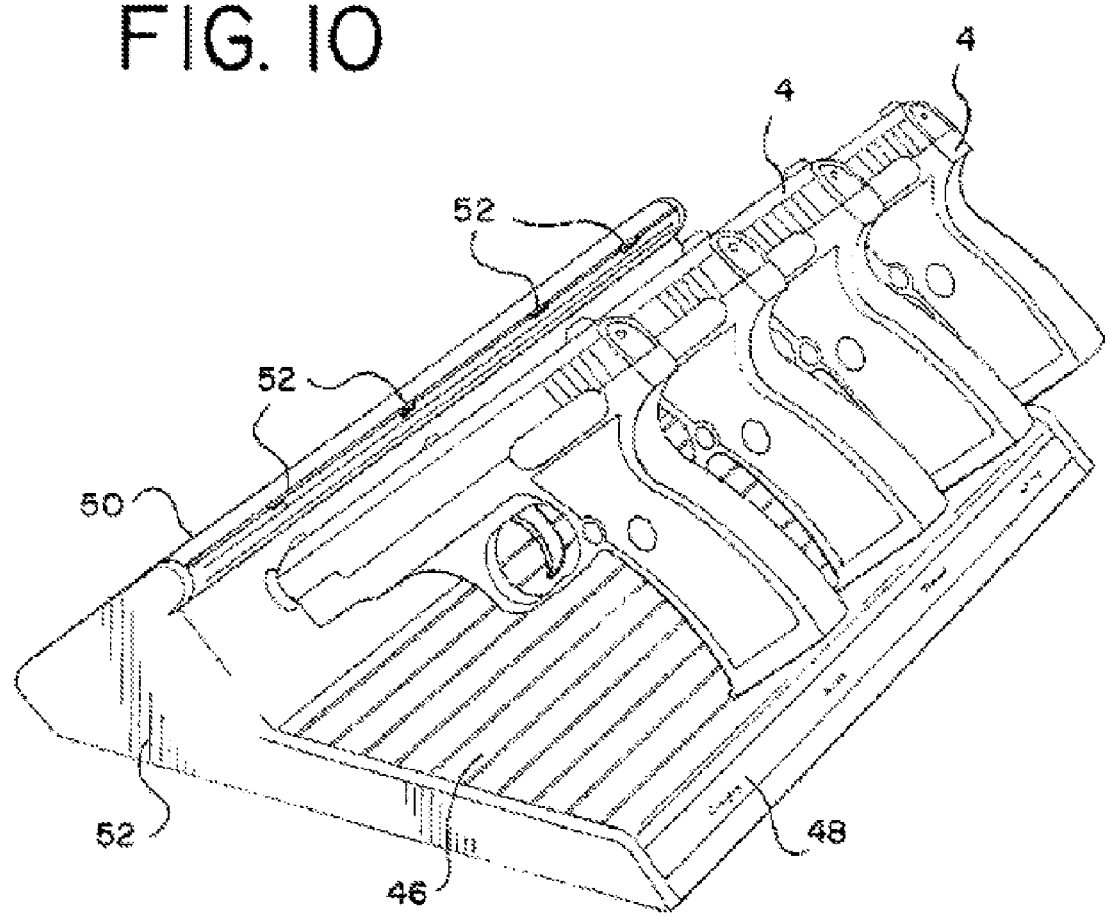
Figure 11:
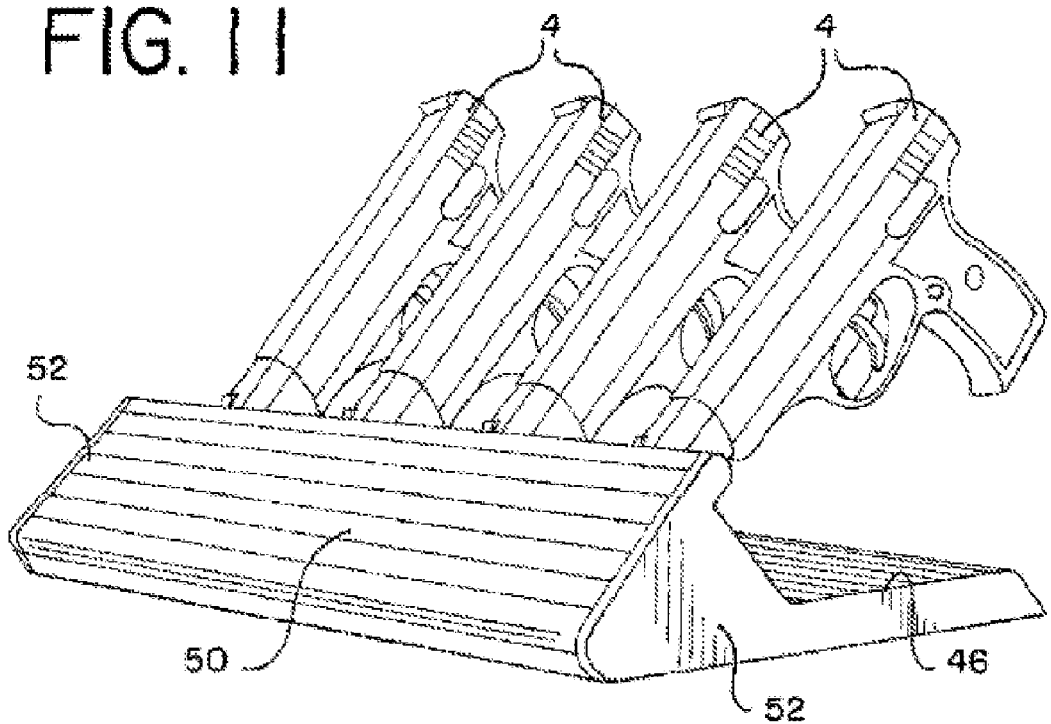
Figure 12:
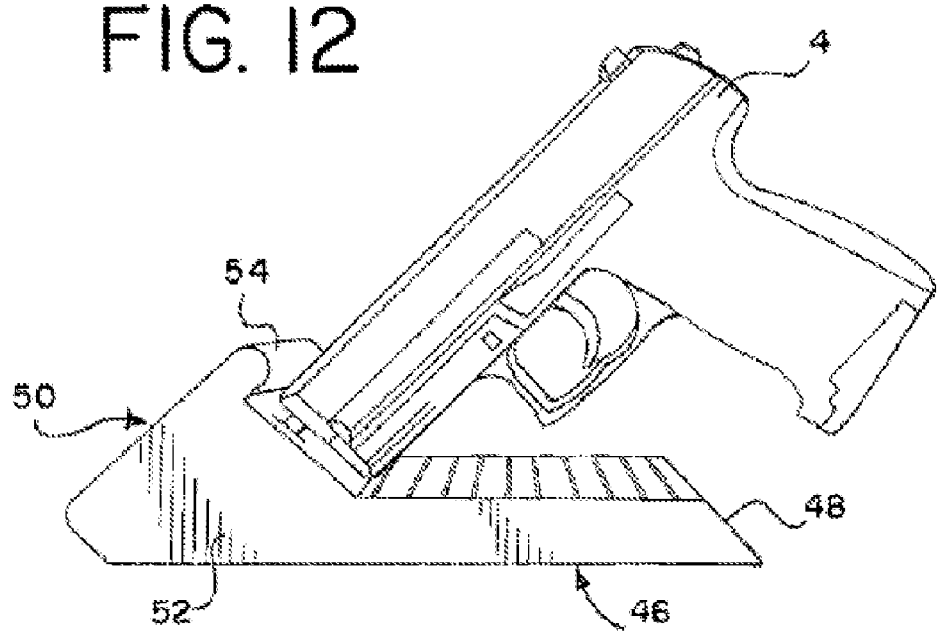

The embodiment shown in FIG. 3 is different from the embodiment in FIG. 2 in that a support 8 is arranged on the base 2 instead of a safety unit 6. The support 8 can, e.g., be designed as a rod or a bar made of metal extending away from the base 2. The support 8 can have a circular or a polygonal cross-section. A polygonal cross-section of the support 8 can be advantageous if a gun needs to be arranged in different orientations (e.g., in the direction of the grip of a handgun) on the base.

As shown in FIG. 3, the support 8 can have a thickened section 20. The thickened section 20 can improve the connection with a safety unit (not shown) designed separately from the base 2 for the securing of a gun on the base 2.

FIG. 4 shows a design of a safety unit 6 for the embodiment in FIG. 2, the connection 10 of which to the base 2 is only partially shown. As shown in FIG. 4, the safety unit 6 has a safety section 12. As described above, the safety section 12 is measured such that it is inserted into a barrel of a gun that is not shown, in particular into a rear part of the barrel, and can be arranged there. This can prevent the removal of a gun secured to the base 2 in that a portion of the barrel is sawn off. Preferably, the safety unit 6 and advantageously the safety section 12 can be inserted far enough into the barrel of a gun so that the safety unit 6 or the safety section 12 prevents the loading of munitions, blocks loading devices of the gun, which load munitions into the barrel, and prevents the opening and turning of a drum and such.

The safety section 12 represents in particular a section, which can be secured in the barrel of a gun in a positive-locked and/or friction-locked manner. To this end, it is provided that the safety section 12 can be locked or braced in the barrel. This represents a safety state of the safety section 12. In order to remove the safety section 12 from the barrel, the positive-locked and/or friction-locked connections with the inside of the barrel are released, in that, e.g., the safety section 12 is unlocked or released. This state represents a safety state of the safety section 12.

A penetration protection 22 is arranged between the safety section 12 and the connection 10. The penetration protection 22 has at least one diagonally arranged element 22a, 22b, 22c. The element(s) 22a, 22b, 22c are designed such that, if the safety section 12 is located in its safety state, forces, which work in particular in the longitudinal direction of the safety unit 6, in order to make it hard to remove the safety unit 6 from the barrel of the gun, cause a decrease in the incline of the diagonally placed elements 22a, 22b, 22c (in other words, the diagonal elements are aligned). This causes a type of radial expansion, whereby at least some of the diagonal elements 22a, 22b, 22c ensure (another) positive-locked and/or friction-locked connection with the inside of the barrel. This increases the forces, which secure the safety unit 6 in the barrel. Preferably, the penetration protection 22 is designed such that forces for the forced/unauthorized removal of the safety unit 6 from the barrel can lead to it becoming damaged if the elements 22a, 22b, 22c are displaced far enough.

A comparably designed penetration protection 24 can be provided adjacent to the free end of the safety unit 6.

A plating 26 can be arranged on the free end of the safety unit 6. The plating 26 serves to protect from manipulation from the side of the cartridge chamber. The plating 26 can, e.g., be made of a hard metal, a ceramic material and/or other resistant materials.

The safety section 12 has a clamping device 28. The clamping device 28 comprises clamping jaws 30, which can be forced apart by means of a, e.g., wedge- or cone-shaped tensioning device 32. When the tensioning device 32 is located in a position, in which no forces forcing apart the clamping jaws 20 are exerted on the clamping jaws 30, the safety section 12 is located in its release state. When the clamping jaws 30 are forced apart by the tensioning device 32, the safety section 12 is located in its safety state.

The extent to which the clamping jaws 30 are forced apart for a state securing the safety unit 6 in the barrel of the gun can, e.g., be determined depending on the quality of the material and/or the dimensioning of the barrel. This can, e.g., be set via corresponding inputs on the controller 14. Alternatively or additionally, it is provided to record forces created by the tensioning device 32 and/or exerted on the clamping jaws 30. If a few or many of these forces reach a limit value such that the barrel will be damaged, the extent to which the clamping jaws 30 are forced apart can be restricted or reduced in a suitable manner (slightly).

Furthermore, the tensioning device 32 can further increase the forces created for securing if the safety unit 6, should it be removed from the barrel in a forced/unauthorized manner, which can be determined by means of force sensors (not shown).

In order to force apart the clamping jaws 30 for the safety state of the safety section 12, the tensioning device 32 is moved accordingly by means of an actor 34. In FIG. 4, this corresponds with a movement of the tensioning device 32 to the right. An actor 34, which works together with the tensioning device 32 via a rotatable spindle 36, can, e.g., be used to move the tensioning device 32. Alternatively, an actor 34 can be used, e.g., in the form of one or more piezo-electrical elements, which work directly with the tensioning device 32 and can move them. Furthermore, one or more electromagnets and/or electromotors and/or one or more memory metal comprising actors (e.g., SMA wire) can be used as actor 34. In order to bring the safety section 12 into a release state, the tensioning device 32 is moved in the opposite direction, whereby the clamping jaws are moved in the direction of their original, released state.

A control unit 38 serves to control the actor 34 and, if applicable, to record and assess forces created by the safety section 12 and/or have an effect on it. The control unit 38 is controlled by the controller 14 in order for the controller 14 to bring the safety section 12 into the safety state and the release state.

It is also provided to use only the controller 14 or only the control unit 38, which then provide the functions of the other components.

Control signals and energy can be relayed to the control unit 38 and the actor 34 via a connection (not shown), which extends to the base 2 via the connection 10 and from there to the controller 14 and/or a power supply (not shown).

FIG. 5 shows an embodiment of a safety unit 6, which is provided for use in the case of the embodiment in FIG. 3 with a support 8 attached to the base 2. If not indicated otherwise, the above specifications, with respect to the embodiment of the safety unit 6 in FIG. 4, also apply to the embodiment according to FIG. 5.

The safety unit 6 according to FIG. 5 can be connected with the base 2 via the support 8. The support 8 can be inserted in a recess 42 through an opening 40.

The safety unit 6 in FIG. 5 comprises a first safety section 12 with a clamping device 28. The clamping device 28 comprises clamping jaws 30 and a tensioning device 32, which can be moved by means of an actor 34. The corresponding area of the safety unit 6 on the right in FIG. 5 is comparable with the area shown to the right of the penetration protection 22 in FIG. 4. This area and, in particular, the first safety section 12 in FIG. 5 provide the functions of the embodiment in FIG. 4, which serve to secure it in a barrel of gun or to release it.

Furthermore, a second safety section 12', which surrounds the recess 42 or in which the recess 42 is designed, is provided. The second safety section 12' is a section, which can ensure positive-locked and/or friction-locked connections with the outside of the carrier 8, in order to permanently secure the safety unit 6 on the support 8. The safety section 12' can thereby be inserted into the barrel of the gun completely, partially or not at all.

On the end adjacent to the opening 40, the safety unit 6, comparable with the penetration protection 22 in FIG. 4, has a penetration protection that is not shown here. This embodiment provides to design individual diagonal elements of the penetration protection in a ring-shaped or other manner, making it possible to arrange the elements to surround the recess 40.

The second safety section 12' has a clamping device 28' with clamping jaws 30'. The clamping jaws 30' can be forced together by means of a tensioning device 32'. A working connection can thereby be established between the clamping jaws 30' and the area of the support 8 arranged in the recess 40. If the tensioning device 32' is located in a position in which no forces are exerted on the clamping jaws 30' forcing them together, the second safety section 12' is located in its release state. If the clamping jaws 30' are forced together by the tensioning device 32', the second safety section 12' is located in its safety state.

This embodiment provides that the tensioning device 32' is designed in a ring- or hollow-cylinder-like manner. When the tensioning device 32' is activated using an actor 34', it is provided to move the tensioning device 32' along the clamping jaws 30'. It is also possible to provide the clamping jaws 30' at least partially with an external thread and the tensioning device 32' with an internal thread. In this manner, the tensioning device 32', comparable with a nut, can be screwed onto the clamping jaws and unscrewed from them.

Otherwise, the above and following specifications, with respect to the components and functions of the first safety section, also apply to the second safety section.

The control unit 38 shown in FIG. 5 is provided for controlling the actors 34 and 34'. It is also possible to use one control unit for the actor 34', which can be arranged, e.g., between the actor 34 and the other safety section 12', and another control unit for the actor 34'.

It is also provided to design the area of the safety unit 6 specified with reference number 44 in FIG. 5 as a predetermined breaking point. The predetermined breaking point 44 can, e.g., be designed such that it is destroyed if predetermined tractive forces and/or torsional forces and/or shear forces are exerted and/or exceeded in this area of the safety unit 6. For example, if an unauthorized person tries to forcibly remove the safety unit 6 from the barrel of a weapon, the predetermined breaking point 44 is destroyed with the appropriate force. The area of the safety unit 6 lying left of the predetermined breaking point 44 in FIG. 5 can be removed from the gun, but the area of the safety unit 6 lying to the right of the predetermined breaking point 44 remains secured in the barrel by means of the first safety section 12.

When using the embodiment of the safety unit 6 in FIG. 5, a safety can first take place in the barrel of a gun using the first safety section 12 and then a fixing by means of the second safety section 12' on the support 8. Alternatively, it is provided to secure the safety unit 6 first on the support 8 and then to brace it in the barrel of a gun.

In order to remove a gun secured on the support 8 with the safety unit 6 from the base 2, it is provided to bring the second safety section 12' into its release state. The working connection ensuring the securing of the gun with the support 8 is thereby ended. The gun can be removed together with the safety unit 6 that remains secured in the barrel. This allows the removal of the gun.

The operation of the gun is not possible based on the safety unit 6 arranged in the barrel. In order to only enable the operation of the gun by authorized persons, the safety unit 6 can only be removed from the barrel when data and/or information is provided to the control unit 38 specifying such authorization. Such data and/or information can, e.g., be transmitted to the control unit 38 wirelessly. The wireless transmission options first named for controller 14 can also be used here. Data and/or information can also be transferred to the control unit 38 in that an interface (not shown) is used, which surrounds the opening 40 and/or is at least partially provided in the recess 42. This type of interface can, e.g., have one or more contact surfaces, contact pins, contact bushings, connectors and such. If the interface is equipped with a correspondingly designed interface of a device, which has data and/or information indicating authorization to operate the gun, it can be transferred to the control unit 38. Such interfaces can also be used to supply power to the control unit 38.

This interface or an interface comparable with respect to the storage on the safety unit 6 can be used to feed control signals and energy to the control unit 38 and/or to the actors 34 and/or 34', which are transferred via the support 8 or wires arranged in it and/or on it.

In the case of the embodiment in FIG. 5 and other embodiments, which can be separated from the base, it can be advantageous to use only one control unit integrated into the safety unit, which provides, at least partially, functions of the aforementioned controller (e.g., operation logging, creation of log files). Data and/or information indicating user authorization can thereby be provided via an external input unit or interface that can be connected with the control unit and/or via an input device also integrated into the safety unit. Means designed for wireless transfer are particularly advantageous here. Furthermore, an energy supply integrated into the safety unit can be used in order to be able to operate the safety unit independently. Data and/or information on the operation captured from the control unit can be made available, preferably wirelessly.

Alternatively, the gun can be removed from the base in that the first safety unit 12 is brought into its release state. The second safety section 12 thereby remains secured on the base. This embodiment can, e.g., be used if a user is authorized to remove and operate the gun. Furthermore, it is also possible to arrange safety units on the base 2 that are designed for guns of different calibers. In the case of a gun with a barrel, the inner diameter of which is too large or too small for the dimensioning of the first safety section 12, the safety unit fastened on the support 8 can be replaced by a safety unit, the first safety section 12 of which is suitable for arrangement in the barrel.

In the case of a modification of the embodiment in FIG. 5 (not shown), the area of the safety unit 6, which serves for the securing on a support 8 of the base 2 (mainly the area with the second safety section in FIG. 5), is designed mainly the same as the area, which serves for the securing in the barrel and/or the cartridge chamber of a gun (mainly the area with the first safety section 12 in FIG. 5). In one model, the two areas, in particular their safety sections, can be designed as mirror images of each other, i.e., be assembled like twin constructions.

This embodiment is, e.g., advantageous if the support at least has the form of a tube that is open on one end or has another recess, into which the safety unit can be inserted at least so far that the corresponding safety section can be secured in the support. Otherwise, the specification referring to the embodiment in FIG. 5 also applies to this embodiment.

FIG. 6 shows another embodiment of a safety unit 6, which is provided for use in the case of the embodiment in FIG. 3. The embodiment if FIG. 6 is different from the embodiment according to FIG. 5 mainly in that the area of the safety unit 6, which serves for the securing on the support 8, is surrounded by the section of the safety unit 6, which serves for the securing in the barrel of a gun. The predetermined breaking point 44, which can be arranged between the named sections of the safety unit 6, is also hereby provided.

In the case of other embodiments not shown here, an optionally controllable, lockable and unlockable bayonet lock or such can be used instead of a second safety section described above in order to secure the safety unit on the support.

Safety units are also possible, in which, instead of the second safety section, a section that cannot be secured to the base can be connected in a detachable manner (e.g., through insertion) to a base or a support extending from it. Generally speaking, this enables the removal of the gun. In order to protect the gun from unauthorized use, the safety unit can be connected with the base or the controller to transfer data and information via a cable connection (e.g., for better mechanical securing with a steel core). This connection makes it possible to bring the first safety section into the release state in order to be able to separate the safety unit from the gun. If this connection is broken, the safety unit remains secured in the gun and cannot be removed. This eliminates the need for a control unit that is integrated into the safety unit if the control unit would allow the first safety section to be brought into the release state without a connection to the controller.

Safety units are also possible in which a second safety section is used for the securing on the base and a safety section that is only secured and unsecured mechanically in the gun is used instead of the first safety section. It is hereby provided that the second safety section serves to secure the gun on the base or to release it from the base. In the case of such embodiments, the mechanically securable or releasable safety section can preferably only be separated from the gun if the second safety section is at least released or released and removed from the base beforehand with appropriate user authorization. Thus, for example, such release or release and removal of the second safety section can be a prerequisite for making accessible specified areas and/or components of the safety unit for mechanical activation or release of the safety section secured in the gun.

FIGS. 7 through 26 show perspective views of devices according to the disclosure that are explained in greater detail below.

FIGS. 7 through 12 show an embodiment, which can be used, e.g., to arrange guns on a table, in a display case, in a cabinet or such. In this embodiment, the base comprises a base plate 46, which has an area 48, e.g., on one side, in which information (e.g., weapon type, name of the weapon owner/user) on a weapon 4 that can be arranged above it can be provided. Furthermore, the base has a main body 50. The main body 50 can be designed as one piece with the base plate 46 or can be provided as a separate component that can be connected with the base plate 46, e.g., via gluing, plugging, snapping, welding, fusing, etc.

In one preferred embodiment, the main body 50 can be made of a string material that can be cut into the desired lengths. The use of string material is also provided in the case of the single-piece model of base plate 46 and main body 50 as well as for the base plate 46, if these are provided as a separate component.

Side parts 52 can be used in order to cover and/or lock potential side openings in particular in the case of the use of string material.

Display elements 54 are provided on the main body 50, preferably in correlation to the areas where a gun 4 can be arranged. The display elements 54 can create, e.g., optical signals, which indicate whether or not a weapon 4 can be removed from the base 2. Thus, for example, it is provided that the display elements 54 emit a red light if a weapon 4 is secured on the base 2 and a green light if a weapon 4 can be removed from the base 2. The display elements 54 can be, e.g., LEDs.

Deviating from the embodiment shown in FIGS. 7 through 12, it can be provided to arrange more than the four shown guns or fewer guns. This can be achieved through appropriate dimensioning of the base 2 and/or a corresponding number of safety units 6 (not shown here). In the case of the embodiment shown, four safety units 6 can, e.g., be provided according to the provided number of guns. In one weapon model, one single safety unit 6 can be used.

In order to build the embodiment shown in FIGS. 7 through 12, the safety units and the respectively assigned controller components can be designed as one single module. This type of modular structure makes it possible to equip the main body 50 with the desired number of modules, which can be inserted, e.g., into the recesses in the main body 50 or secured there. Electrical connections from and to the module(s) can be achieved via a bus arranged in the main body 50, wiring arrangements and such.

Aside from the explained differences, the above embodiments regarding FIGS. 7 through 12 also apply to the embodiments described below.

Figure 13:
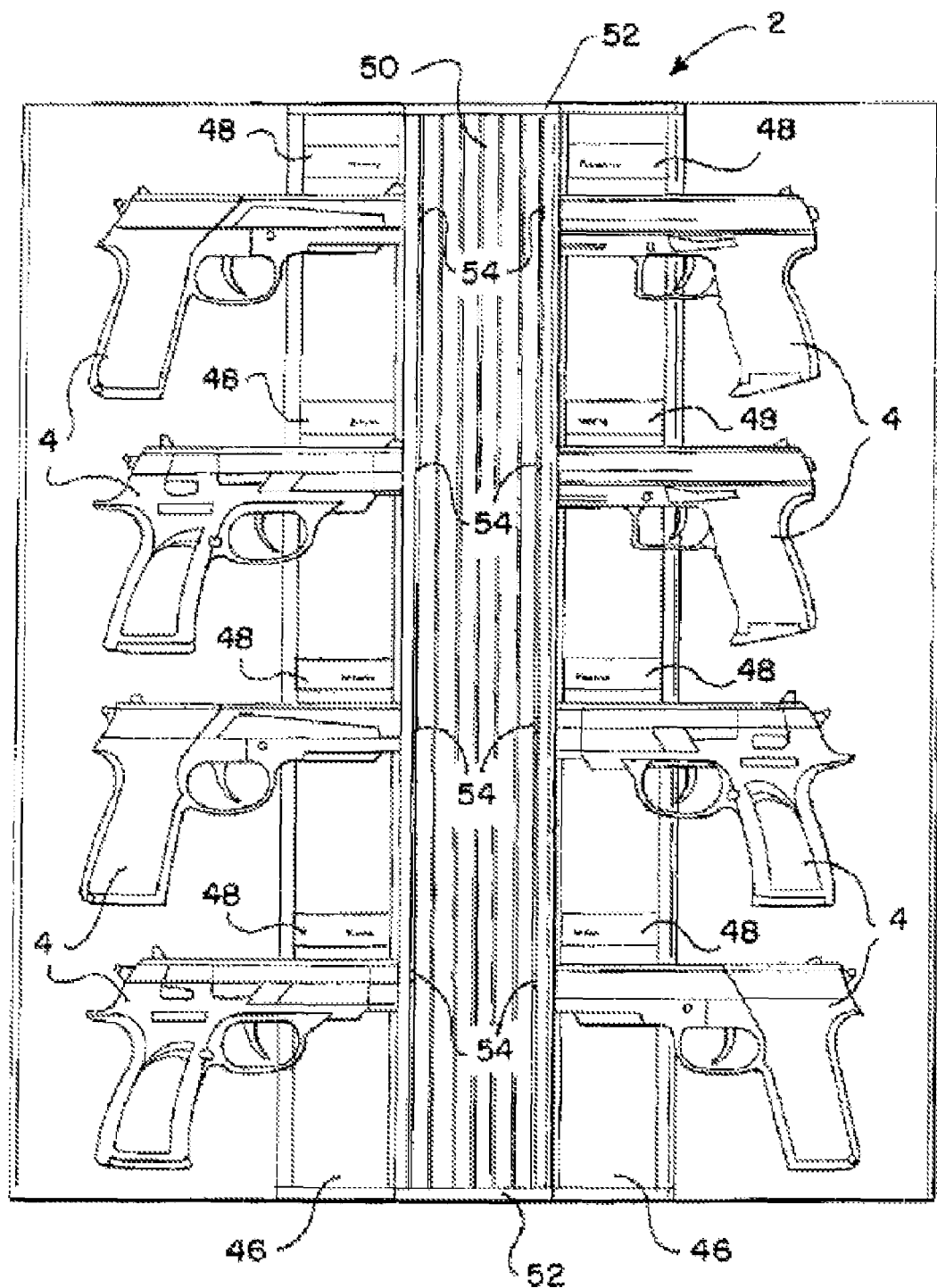
FIGS. 13 and 14 show perspective views of an embodiment of the present disclosure for securing and storing weapons in opposite-lying, two-row arrangements, which can, e.g., be fastened to a wall.
Figure 14:
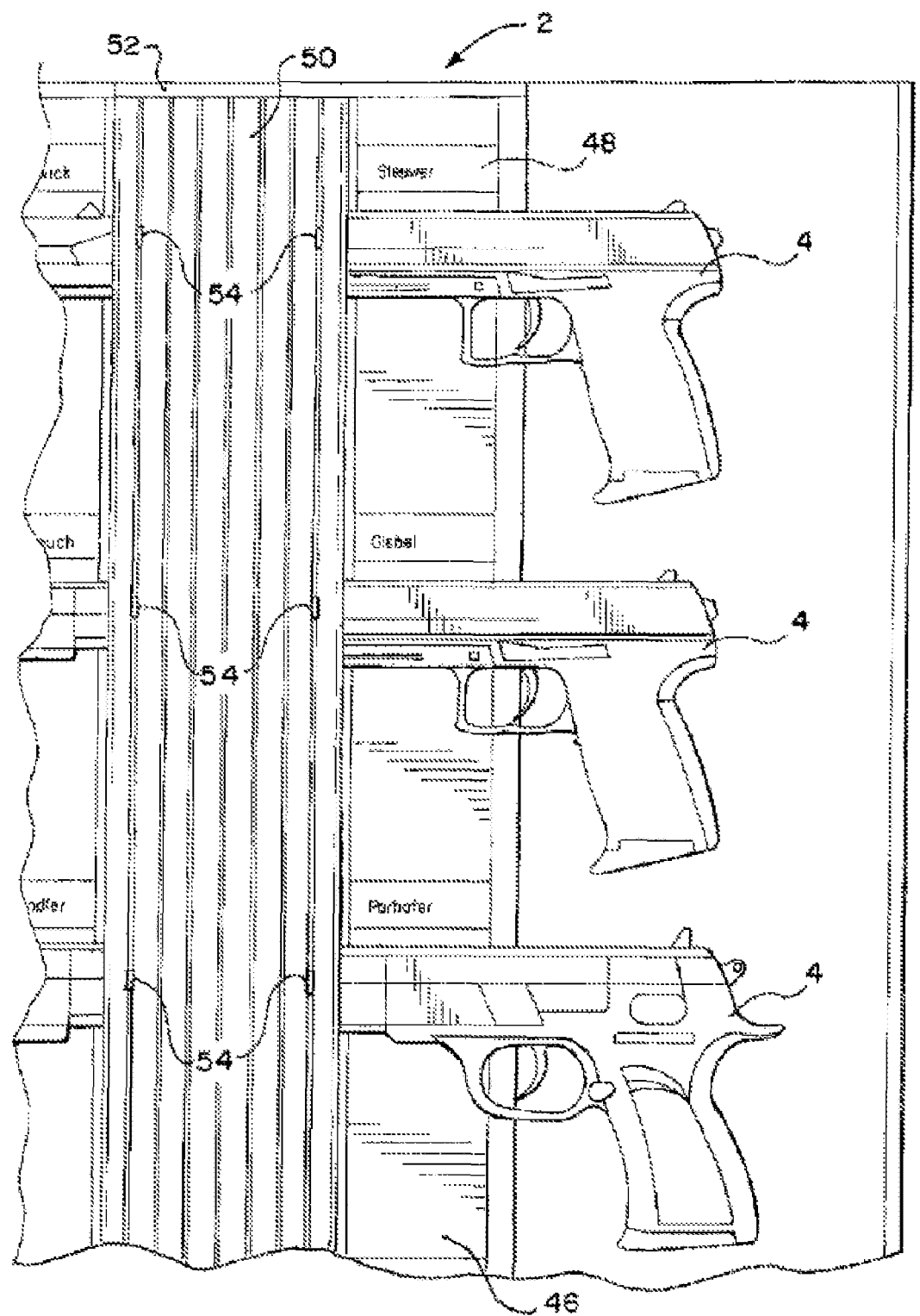

In the embodiment shown in FIGS. 13 and 14, which can be used, e.g., for the arrangement on a wall, a panel and such, the main body 50 is designed such that weapons 4 can be secured one above the other.

Figure 15:
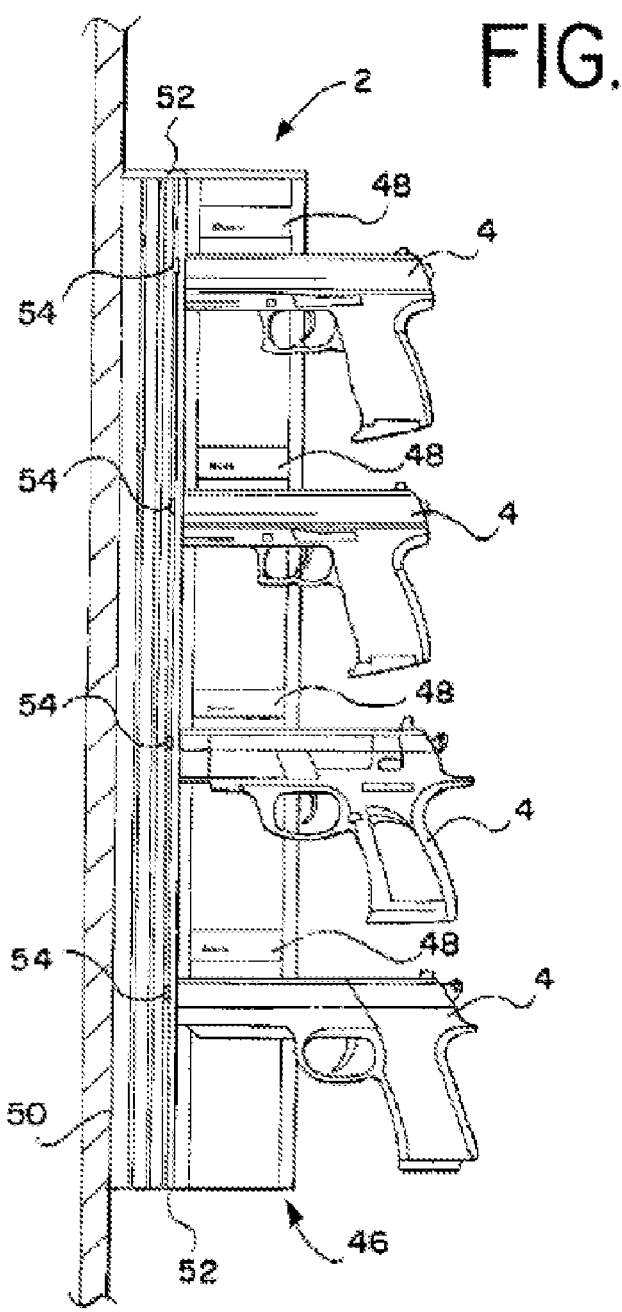
FIGS. 15 to 17 show perspective views of an embodiment of the present disclosure for securing and storing weapons in a single-row arrangement, which can, e.g., be fastened to a wall.
Figure 16:
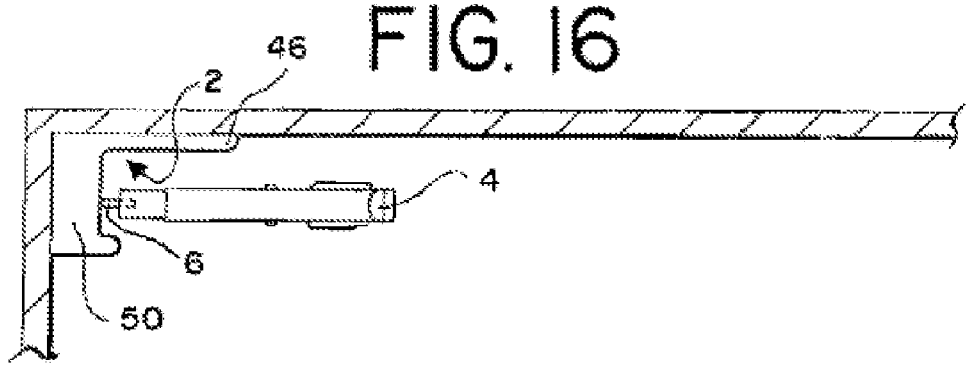
Figure 17:
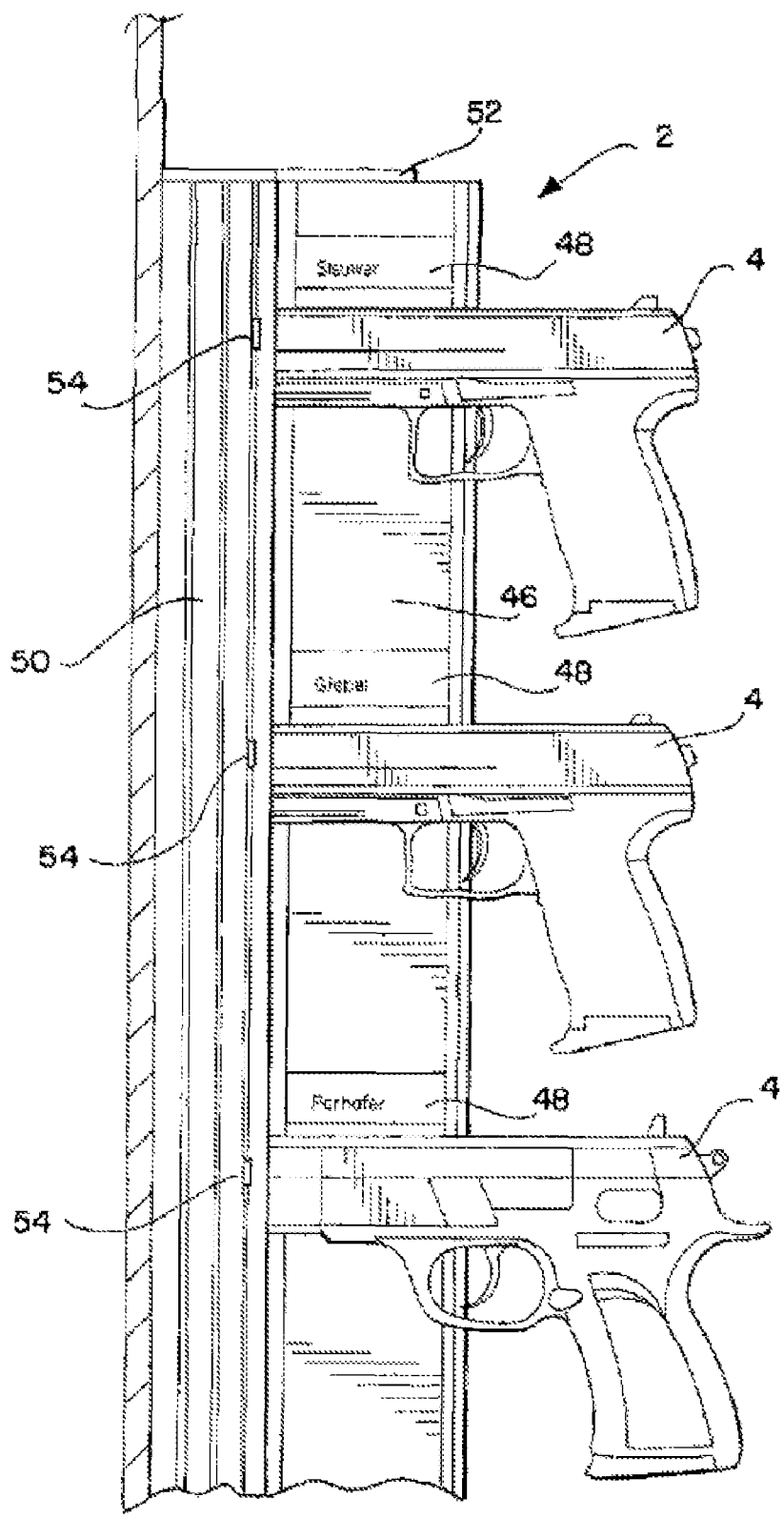

The embodiment shown in FIGS. 15 through 17 can also be used for the arrangement on a wall or a panel and allows the securing of weapons in a series above each other.

Figure 18:
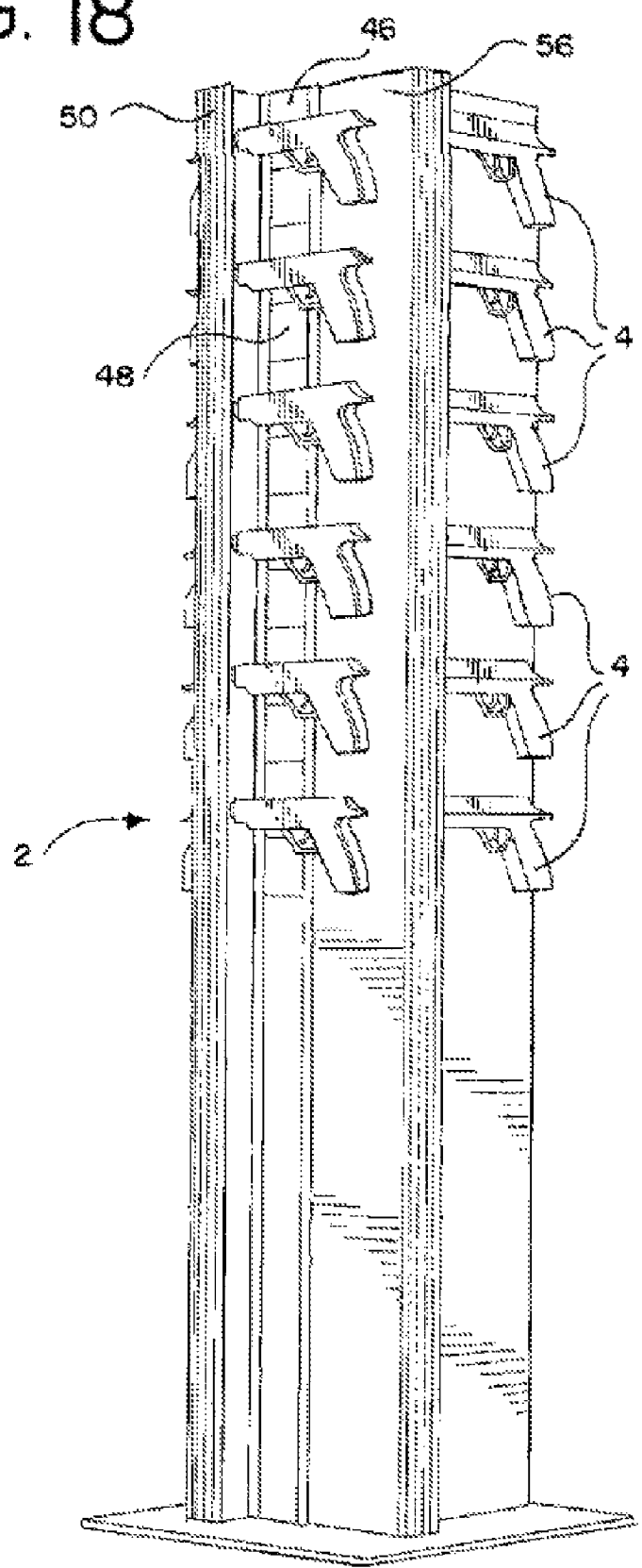
FIGS. 18 to 20 show perspective views of an embodiment of the present disclosure for securing and storing weapons, which can, e.g., be used in a showroom.
Figure 19:
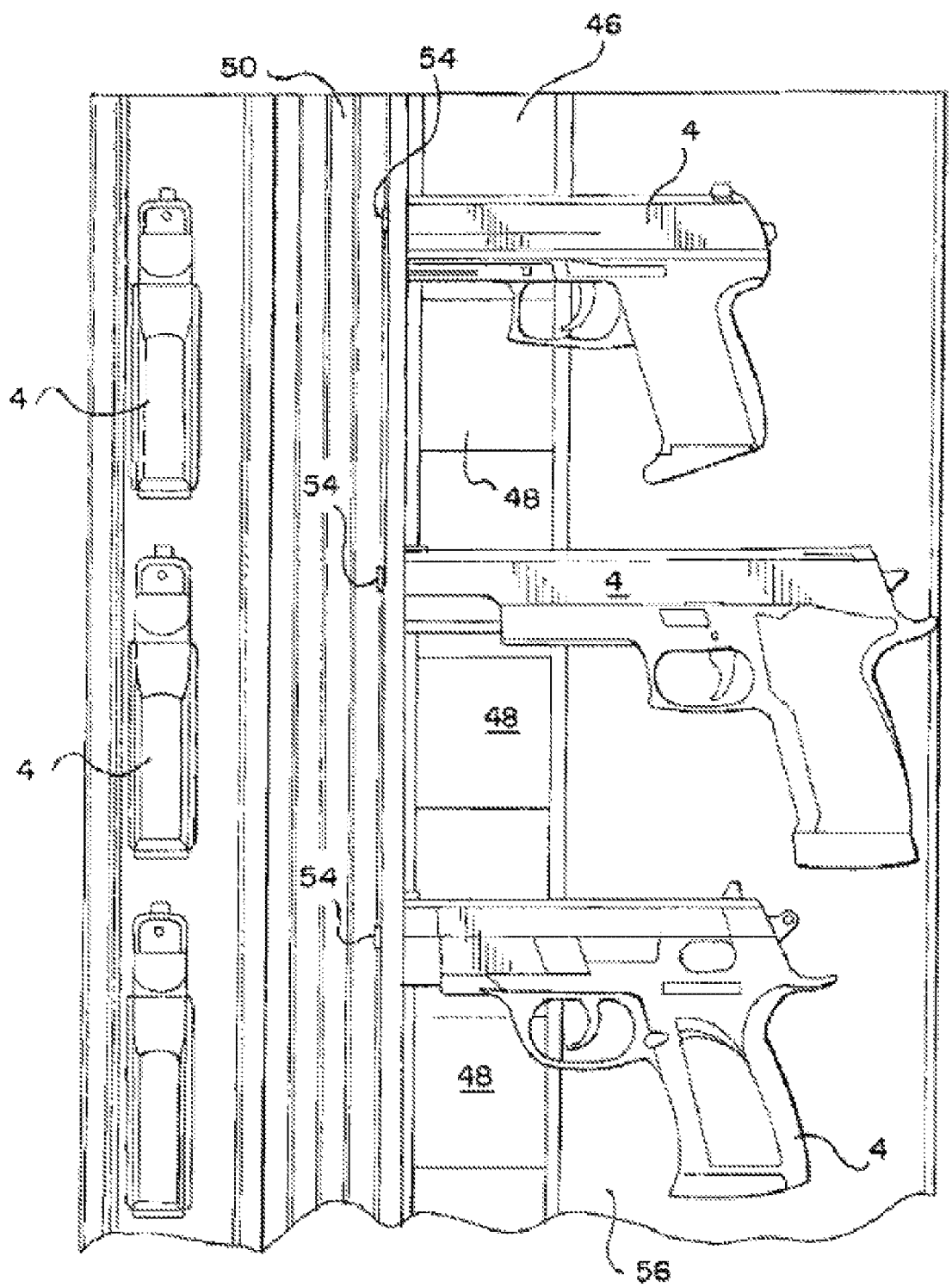
Figure 20:
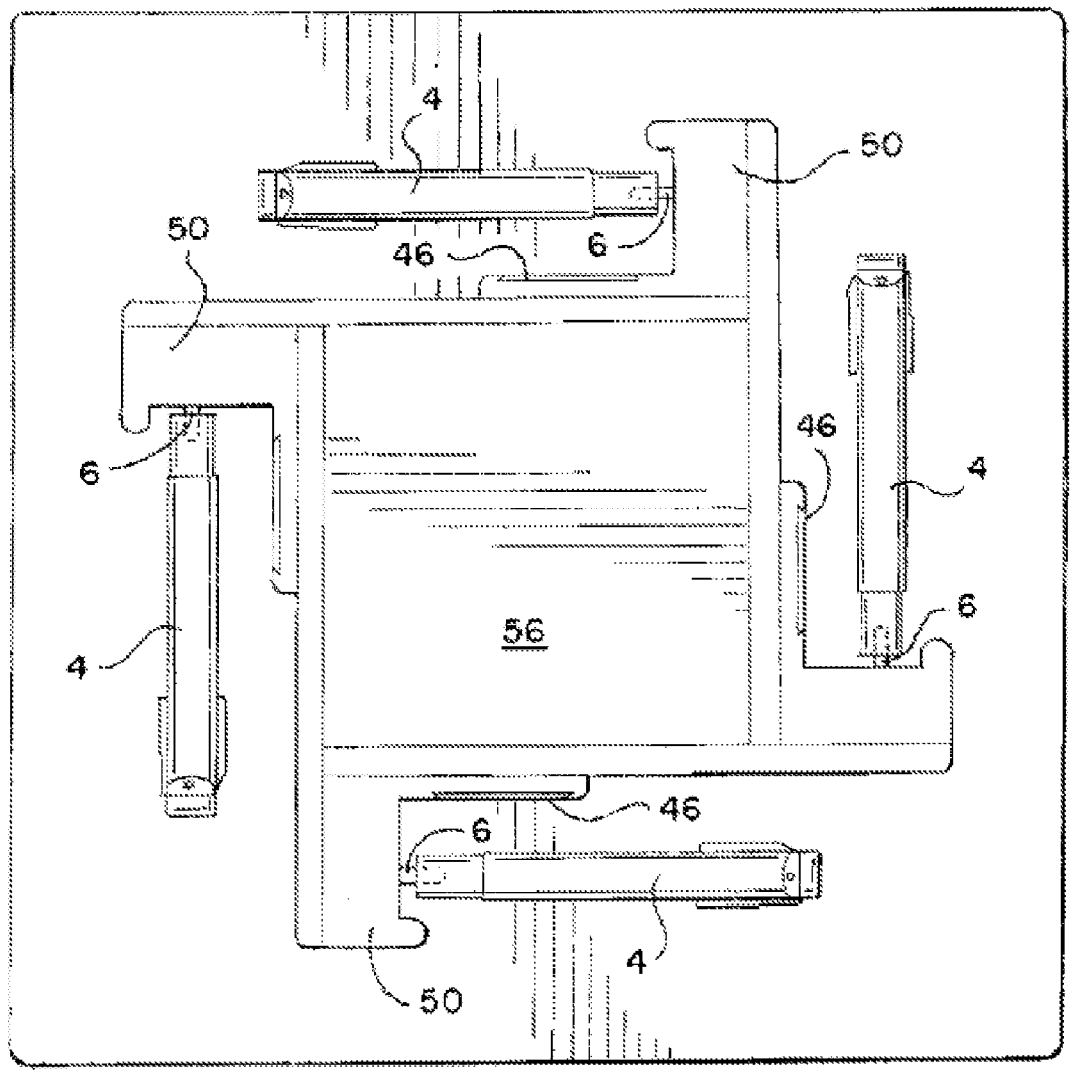
Figure 21:
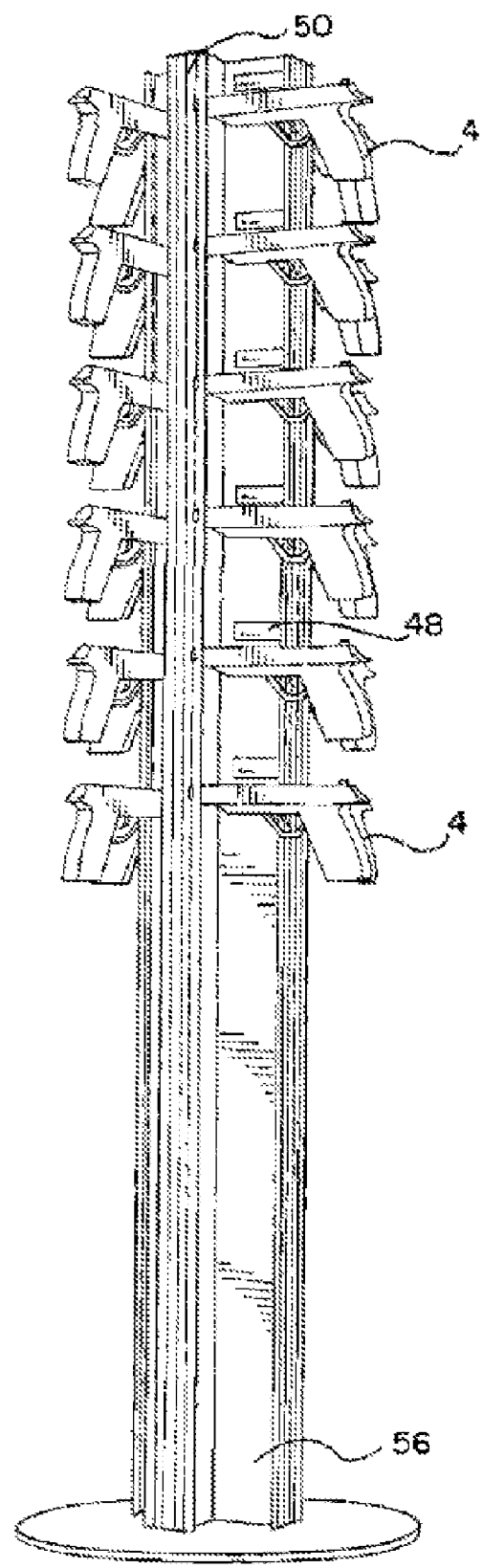
FIGS. 21 to 23 show perspective views of another embodiment of the present disclosure for securing and storing weapons, which can, e.g., be used in a showroom.
Figure 22:
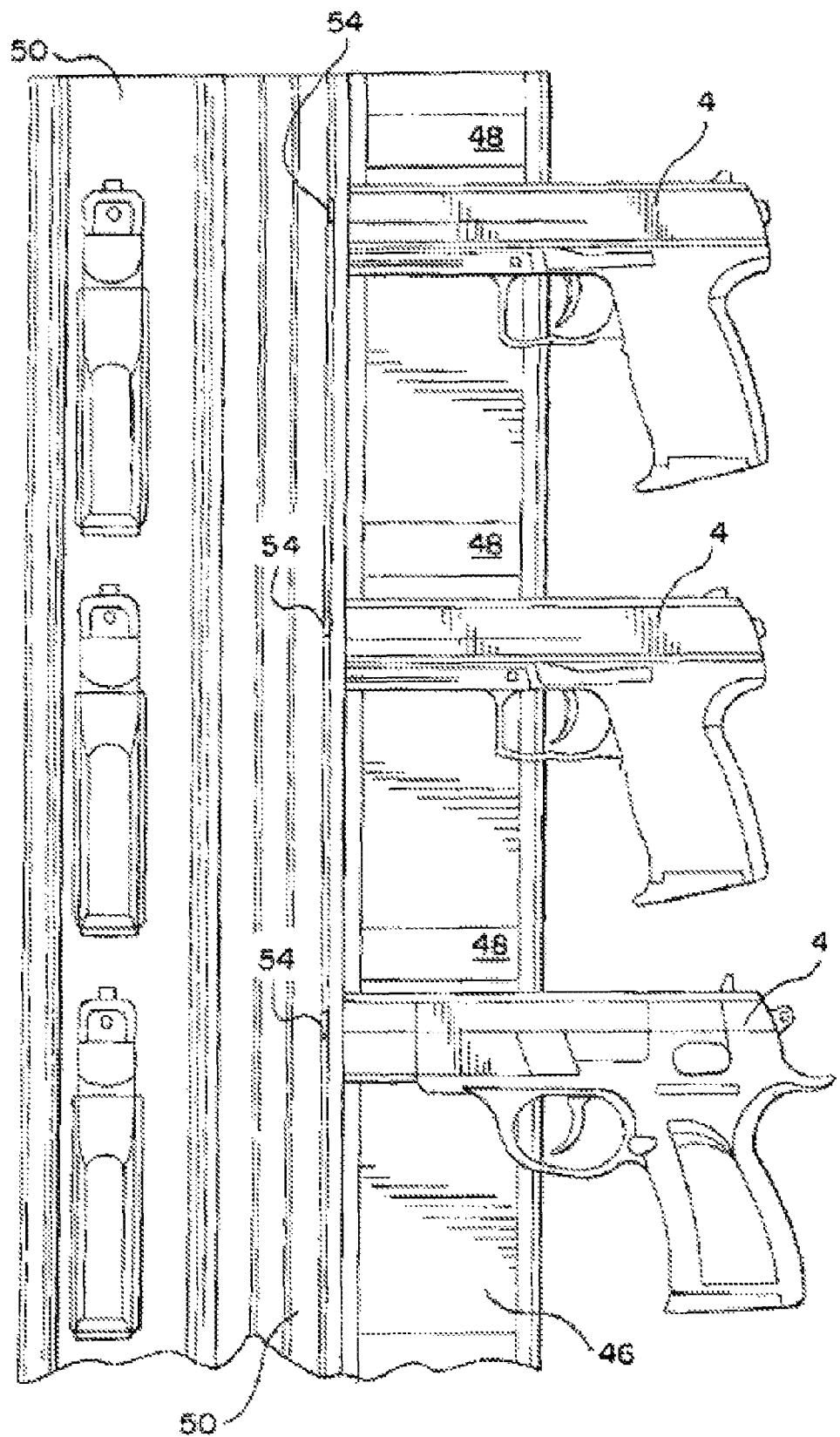
Figure 23:
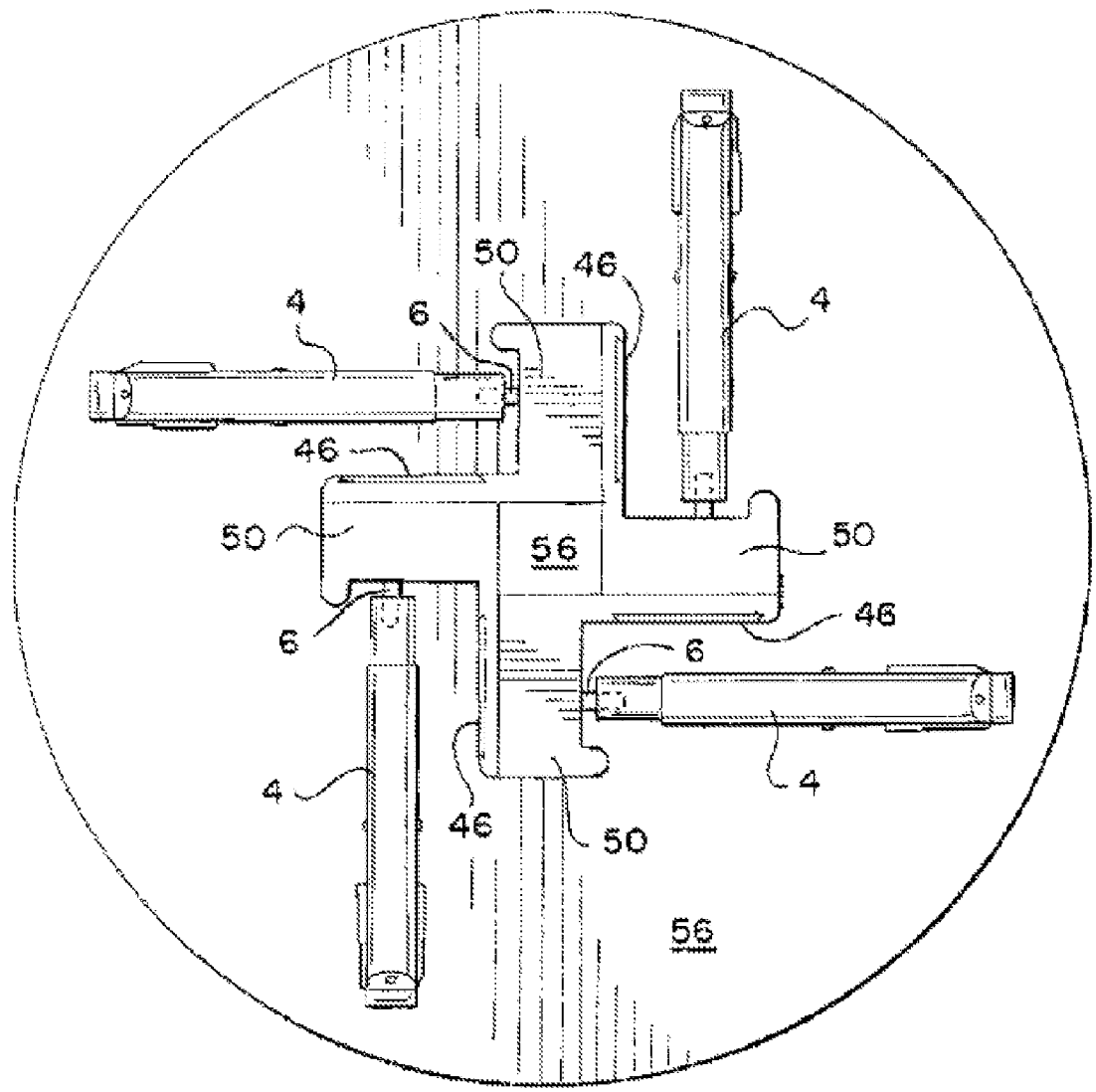

The embodiment shown in FIGS. 18 through 20 comprises a stand 56, which is designed as one piece with the base 2 or can be provided as a separate component. The embodiment in FIGS. 21 through 23 is different in the shape of the stand 56.

Figure 24:
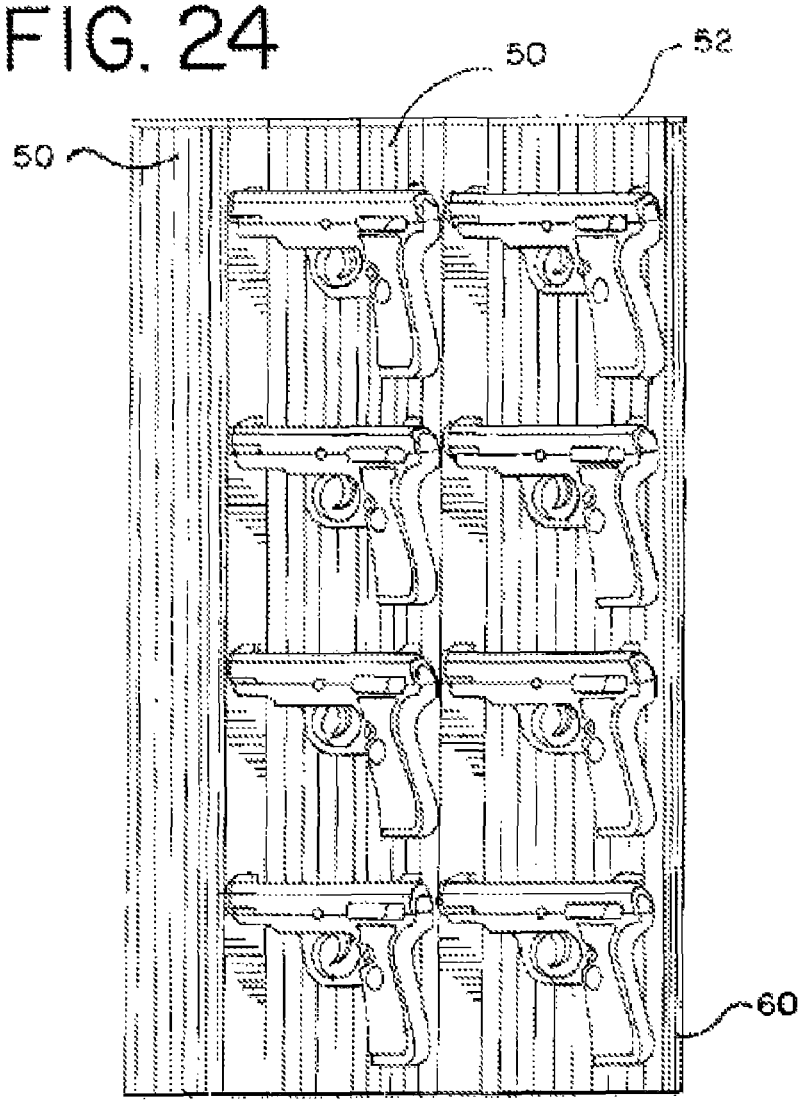
FIGS. 24 to 26 show perspective views of an embodiment of the present disclosure for securing and storing weapons in a parallel, two-row arrangement, which can, e.g., be fastened to a wall.
Figure 25:
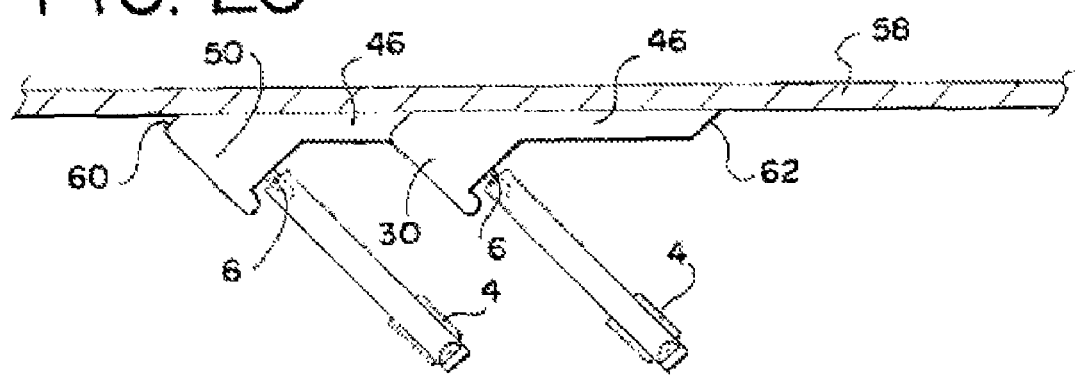
Figure 26:
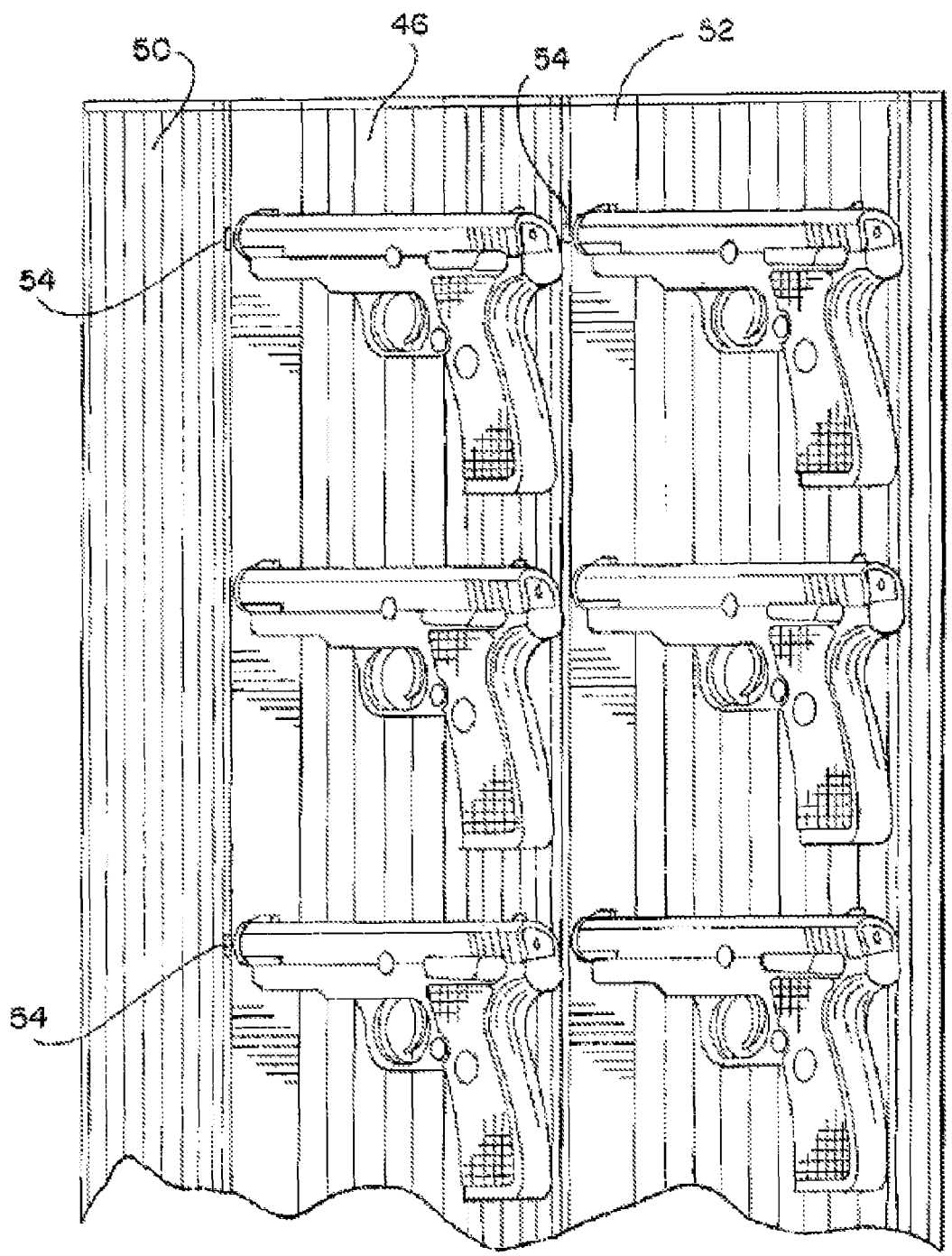

Except for the fact that the variant shown here allows the arrangement and securing of guns at an angle to a surface 58 provided for the fastening to the base 2, the embodiment shown in FIGS. 24 through 26 is comparable with the embodiment in FIGS. 15 through 17. A space-saving arrangement can be achieved if, as shown, the base 2 has sloped areas 60 and 62, which make it possible to arrange several bases 2 on each other in a positive-locked manner.

What is claimed is:

1. A device for the storage of a gun, comprising:
   a base;
   a safety unit coupled to the base for the secure storage of the gun on the base, the safety unit being insertable at least partially into at least one of a barrel or a cartridge chamber of the gun, and the safety unit comprising a first safety section, which can be brought into a safety state, in which the safety unit is secured in the gun, thereby securing the gun to the base, and into a release state, in which the safety unit can be separated from the gun, thereby releasing the gun from the base; and
   a controller, that brings the first safety section into the release state when a user authorization is received to separate the gun and the safety unit.

2. The device according to claim 1, wherein the safety unit is permanently connected with the base.

3. The device according to claim 1, wherein the safety unit can be fastened to the base in a detachable manner.

4. The device according to claim 1, further comprising an authorization verification unit connected with the controller, which is designed to perform a user authorization.

5. The device according to claim 1, further comprising an output unit for the output of data or information to a user.

6. The device according to claim 1, wherein the controller comprises a control unit, the control unit comprising the safety unit.

7. The device according to claim 1, wherein the controller comprises a control unit, the control unit being arranged in a section of the safety unit, which can be inserted into the barrel or the cartridge chamber of the gun.

8. The device according to claim 1, further comprising an input unit designed to input data specifying a user authorization.

9. The device according to claim 1, further comprising an input unit designed to input data specifying a user authorization and which is arranged in a section of the safety unit, which can be inserted into the barrel or the cartridge chamber of the gun.

10. A device for the secure storage of a gun, comprising:
    a base;
    a safety unit including a first safety unit and a second safety unit;
    the safety unit coupled to the gun by a first safety unit and to the base by a second safety unit;
    the first safety section insertable into a barrel or a cartridge chamber of the gun, and which can be brought into a safety state for securing the safety unit in the gun, and into a release state for the release of the safety unit from the gun and thereby releasing the gun from the base; and
    the second safety section, which can be brought into a safety state for securing the safety unit on the base, and into a release state for the release of the safety unit from the base.

11. The device according to claim 10, wherein the second safety section comprises a recess into which a support connected with the base can be inserted, and can be locked on the support surrounding it in a force-locking manner, in order to assume the safety state, and can be unlocked from the support, through the termination of the frictional connection, in order to assume the release state.

12. The device according to claim 10, wherein the second safety section can be inserted into a support connected with the base and can be locked in the support in order to assume the safety state, and can be unlocked in the support in order to assume the release state.

13. The device according to claim 10, further comprising a control unit designed, upon an authorization from a user, to bring the first safety section into its release state while the second safety section remains in its safety state, and to bring the second safety section into its release state while the first safety section remains in its safety state.

14. The device in accordance with claim 10, wherein the control unit is arranged in a section of the safety unit, which can be inserted completely into the barrel and/or the cartridge chamber of the gun.

15. The device according to claim 10, further comprising a unit designed to perform a verification of a user authorization.

16. The device according to claim 10, further comprising a unit designed to perform a user authorization and which is arranged in a section of the safety unit, which can be inserted into the barrel or the cartridge chamber of the gun.

17. The device according to claim 10, further comprising a first actor, which is connected with the first safety section, in order to bring the first safety section into its safety state or its release state.

18. The device according to claim 10, further comprising a second actor, which is connected with the second safety section, in order to bring the second safety section into its safety state or its release state.

19. The device according to claim 10, further comprising an input unit designed to input data or information specifying a user authorization.

20. The device according to claim 10, further comprising an input unit designed to input data or information specifying a user authorization and which is arranged in a section of the safety unit, which can be inserted into the barrel or the cartridge chamber of the gun.

* * * * *